United States Patent [19]

Egawa et al.

[11] Patent Number: 4,903,051

[45] Date of Patent: Feb. 20, 1990

[54] IMAGE FORMING APPARATUS FOR CONTROLLING DEVELOPER TO BE REPLENISHED IN ACCORDANCE WITH DENSITY OF DEVELOPER

[75] Inventors: Jiro Egawa, Yokosuka; Osamu Kenmochi, Yokohama, both of Japan

[73] Assignee: Kabushiki Kaisha Toshiba, Japan

[21] Appl. No.: 222,704

[22] Filed: Jul. 21, 1988

[30] Foreign Application Priority Data

Jul. 22, 1987 [JP] Japan ................................ 62-182739

[51] Int. Cl.[4] ................................................ G01J 15/00

[52] U.S. Cl. .................................... 346/160.1; 355/246

[58] Field of Search .................... 346/160, 107 R, 108, 346/160.1, 150, 153.1; 358/298, 300, 302; 355/245, 246

[56] References Cited

U.S. PATENT DOCUMENTS

| | | | |
|---|---|---|---|
| 4,491,875 | 1/1985 | Kanamura | 358/298 |
| 4,647,180 | 3/1987 | Watanabe | 346/160.1 |
| 4,647,950 | 3/1987 | Nosaki et al. | 346/160 |

*Primary Examiner*—Arthur G. Evans

*Attorney, Agent, or Firm*—Foley & Lardner, Schwartz, Jeffery, Schwaab, Mack, Blumenthal & Evans

[57] ABSTRACT

A laser printer includes a plurality of lenses and mirrors for scanning a laser beam to form an optical image on a photoconductive drum, a developing unit for storing a developer for developing an electrostatic latent image formed on the drum by the plurality of lenses and mirrors, and an image transfer section for transferring the image developed by the developing unit onto paper. The developer is a two-component developer consisting of a toner and a carrier. The toner densities of toner adhered to a toner hopper for replenishing the toner stored in the developing unit and of that adhered to a toner density detecting probe coaxially attached to the drum are measured by utilizing a light-emitting diode and a photodiode. In a CPU, a toner density measured by the light-emitting diode and the photodiode is compared with a first reference value, and then the measured density value is compared with a second reference value which is smaller than the first reference value. When the measured density value is smaller than the first reference value, the replenishment toner is controlled to be replenished from the toner hopper to the developing unit. When the measured density value is smaller than the second reference value, the CPU stops the image forming operation, and at the same time, informs that the replenishment toner in the toner hopper is empty using an operation display section.

27 Claims, 17 Drawing Sheets

IMAGE FORMING APPARATUS FOR CONTROLLING DEVELOPER TO BE REPLENISHED IN ACCORDANCE WITH DENSITY OF DEVELOPER

BACKGROUND OF THE INVENTION

1. Field of the Invention

The present invention relates to an image forming apparatus and, more particularly, to an image forming apparatus for controlling a developer to be replenished in accordance with the density of the developer especially in a laser printer and a copying machine of an electrophotographic type, and the like.

2. Description of the Related Art

A conventional image forming apparatus, e.g., an image forming apparatus in a laser printer or a copying machine of an electrophotographic type often uses a developing unit for developing an electrostatic latent image on a photosensitive body by a magnetic brush method using a two-component developer consisting of a toner and a carrier. In the image forming apparatus using such a developing unit, toner density control is performed in the following manner. The toner density of a developer stored in the developing unit is detected by toner density detecting means, and toner replenishing means of the developing unit is operated in accordance with the detection result. The toner is replenished upon operation of this toner replenishing means so that the toner density of the developer is always automatically controlled to be a constant value. When the replenishment toner amount of the toner replenishing means becomes smaller than a predetermined amount (toner empty), this state is detected and alarmed. More specifically, an actuator arranged in a toner hopper for storing the replenishment toner approaches a lead switch attached to a side surface of the toner hopper as the toner amount is decreased. As a result, the lead switch is turned on by a magnet attached to the distal end of the actuator. Then, a resultant ON signal turns on a toner empty display unit (TOSHIBA LASER BEAM PRINTER TN-7700, for example, U.S. Pat. No. 4,647,950).

In the above-described conventional apparatus utilizing toner empty detection, however, the lead switch is turned on before the toner in the toner hopper is completely emptied. For this reason, toner empty in the toner hopper cannot be accurately detected. In addition, it is difficult to simplify the structure of the toner hopper by forming the toner hopper into a cartridge. This causes an increase in cost. Furthermore, since detection is performed by a mechanical means, the number of required parts is inevitably increased.

SUMMARY OF THE INVENTION

Accordingly, it is an object of the present invention to provide an image forming apparatus, which can detect that the amount of toner to be replenished by the above-described toner replenishing means becomes smaller than a predetermined amount (toner empty), simplify the structure of the toner hopper and reduce the cost.

According to an aspect of the present invention, there is provided an image forming apparatus comprises developer supplying means for supplying a developer for developing a latent image formed on an image carrier, developer density detecting means, arranged on a portion of the image carrier whereon the latent image is not formed, for detecting a density of the developer, comparing means for comparing a developer density value detected by the developer density detecting means with a reference value, and stopping means for stopping operations of the developer supplying means in accordance with a comparison result from the comparing means.

According to another aspect of the present invention, there is provided an image forming apparatus comprises electrostatic latent image forming means for forming an electrostatic latent image in a predetermined area on an image carrier, developer supplying means for supplying a developer for developing the electrostatic latent image formed on the image carrier by the electrostatic latent image forming means, image transfer means for transferring the image developed by the image developer supplying means onto a recording medium, developer density detecting means arranged on a portion of the image carrier whereon the electrostatic latent image is not formed, for detecting a developer density of the developer, comparing means for comparing a developer density value detected by the developer density detecting means with a reference value, and stopping means for stopping operations of the electrostatic latent image forming means or the developer supplying means in accordance with a comparison result from the comparing means.

According to still another aspect of the present invention, there is provided a laser printer comprising: electrostatic latent image forming apparatus for forming an electrostatic latent image in a predetermined area on an image carrier, developer supplying means comprising a developing unit for storing a developer to be used in developing the electrostatic latent image formed on the image carrier by the electrostatic latent image forming means, and developer replenishing means for storing a replenishment developer therein and for replenishing a developer of the developer to the developing unit, image transfer means for transferring the image developed by the developer supplying means onto a recording medium, developer density optical detecting means comprising a lightemitting element for radiating light onto the image carrier, the light-emitting element being arranged on a portion of the image carrier where the electrostatic latent image is not formed and located outside the developing unit, and a light-receiving element for receiving the light radiated from the light-emitting element and reflected by the image carrier, the developer density optical detecting means optically detecting a density of the developer, first comparing means for comparing a developer density value optically detected by the developer density optical detecting means with a first reference value, the first reference value being a value for setting a reference density of the developer, second comparing means for comparing the developer density value optically detected by the developer density optical detecting means with a second reference value, the reference value being a value representing that the developer stored in the developer replenishing means is in an empty state, and stopping means for stoppig operations of the electrostatic latent image forming means, the image transfer means, or the developer replenishing means in accordance with a comparison result from the second comparing means.

BRIEF DESCRIPTION OF THE DRAWINGS

The manner in which the foregoing and other objects of the present invention are accompanying specification and claims considered together with the drawings, wherein:

FIGS. 9A through 9I are flow charts showing an overall operation of the laser printer.

DETAILED DESCRIPTION OF THE PREFERRED EMBODIMENT

An embodiment of the present invention will be described below with reference to the accompanying drawings.

Figure 1:
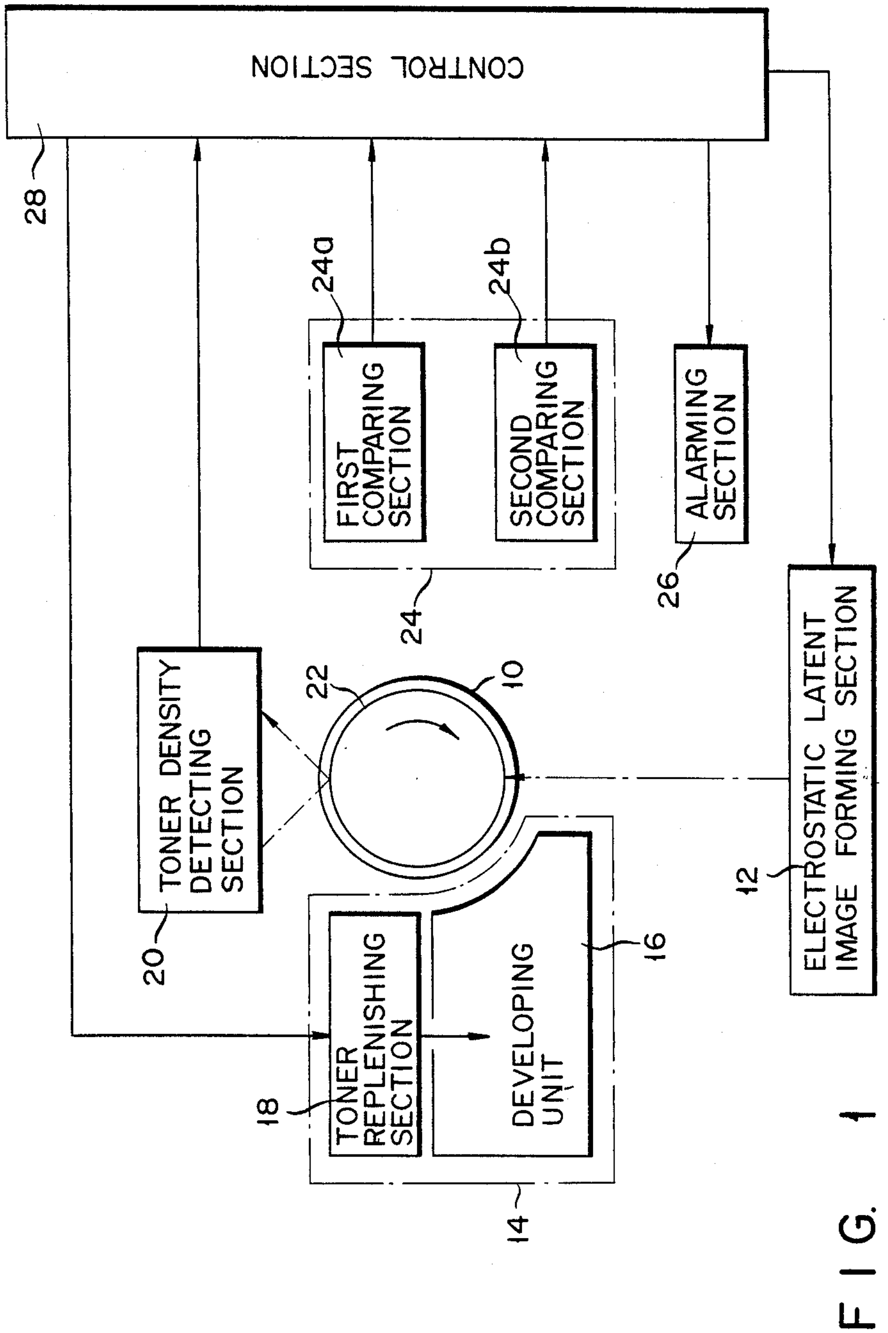
FIG. 1 is a block diagram showing a schematic arrangement of an image forming apparatus according to the present invention.

FIG. 1 is a block diagram showing a schematic arrangement of an image forming apparatus of the present invention. Referring to FIG. 1, reference numeral 10 denotes a drum-like photosensitive body serving as an image carrier in the image forming apparatus. The surface of photosensitive body 10 is irradiated with scanning light from electrostatic latent image forming section 12 for forming an electrostatic latent image. Reference numeral 14 denotes a developing system for developing an electrostatic latent image formed on photosensitive body 10. Developing system 14 comprises developing unit 16 arranged to oppose photosensitive body 10, and toner replenishing section 18 for replenishing a toner to developing unit 16 as needed. Toner replenishing 18 is detachably arranged in the main body of the toner density system.

Reference numeral 20 denotes a toner density detecting section for detecting the toner density of a stored in developing system 14. For example, a toner density is detected by optically detecting a change in amount of a toner adhered to toner density detecting probe 22 using a reflection type sensor consisting of a light-emitting element (light source) and a light-receiving element. Toner density detecting probe 22 is formed into, e.g., a cylindrical shape having the same outer diameter as that of photosensitive body 10 (in the drawing, however, they have different outer diameters for illustrative convenience). In addition, toner density detecting probe 22 is coaxially attached to one end portion of photosensitive body 10, and is rotated with photosensitive body 10, so that a toner is adhered to its outer surface in proportion to the density of the toner.

Reference numeral 24 denotes a comparing section constituted by first and second comparing sections 24a and 24b. First comparing section 24a compares a first reference value (reference toner density) with a detection result from toner density detecting section 20. Second comparing section 24b compares a second reference value (toner density in a toner empty state), which is different from the first reference value, with the detection result from toner density detecting section 20. Reference numeral 26 denotes an alarming section for informing "toner empty", which is arranged in, e.g., an operation panel as a display section. Reference numeral 28 denotes a control section for controlling the overall system.

With such an arrangement, toner density detecting section 20 detects the toner density of a developer, an supplies the detection result to first and second comparing sections 24a and 24b of comparing section 24 through control section 28. First comparing section 24a compares the resultant value detected by toner density detecting section 20 with the first reference value, and supplies a comparison result to control section 28. Control section 28 controls the toner density of the developer by operating toner replenishing section 18 in accordance with the comparison result from first comparing section 24a. More specifically, if the comparison result from first comparing section 24a indicates that the detected density is smaller than the first reference value, control section 28 operates toner replenishing section 18. On the contrary, if it is larger that the first reference value, a toner replenishing operation is not performed.

On the other hand, second comparing section 24b compares the resultant value detected by toner density detecting section 20 with the second reference value. Control section 28 operates alarming section 26 to perform a toner empty display in accordance with the comparison result. At the same time, control section 28 causes electrostatic latent image forming section 12 to stop its image forming operation. More specifically, if the result detected by toner density detecting section 20 is larger than the second reference value, the abovedescribed toner replenishing operation is performed. On the contrary, if it is smaller than the second reference value, a toner empty operation (toner empty display and stop of the image forming operation) is performed.

The embodiment will be described by exemplifying a case wherein the present invention is applied to a laser printer.

Figure 2:
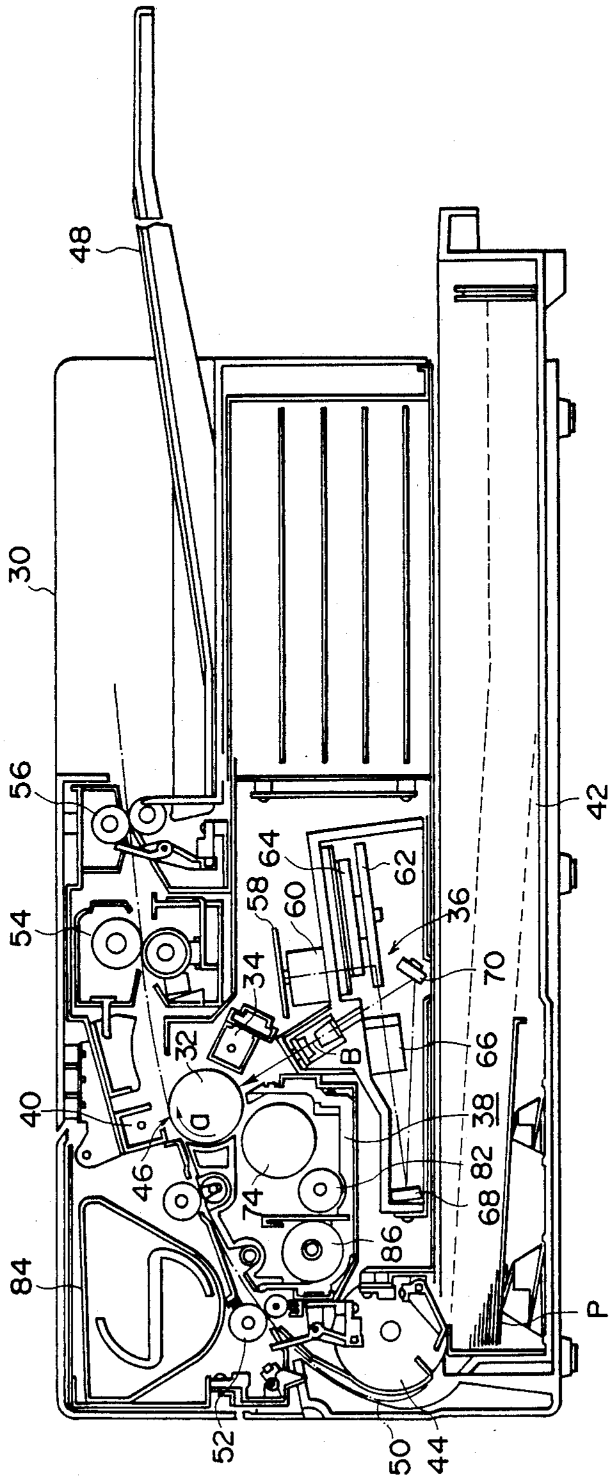
FIG. 2 is a schematic sectional view showing a laser printer to which the image forming apparatus according to the present invention is applied.

FIG. 2 is a schematic sectional view of a monochromatic laser printer of an electrophotographic system. This laser printer is electrically coupled to a host system such as a computer and a word processor through a cable, and the like (not shown). The laser printer receives dot image data from the host system, writes the dot image data on a photosensitive body by modulating a laser beam, develops the written data, and then transfers the developed image onto paper.

More specifically, reference numeral 30 denotes a laser printer body. Photoconductive drum 32 as an image carrier is arranged in body 30. Drum 32 is rotated by a driving source (not shown) in a direction indicated by arrow a in FIG. 2. Main charger 34 of a charge control type, electrostatic latent image forming section 36, developing unit 38 for simultaneously performing developing and cleaning operations, and transfer charger 40 of a charge control type are sequentially arranged around drum 32 along its in the rotation direction thereof.

Feed cassette 42 is arranged in a lower portion of body 30, and convey path 50 is formed to guide paper P as a recording medium picked up by feed roller 44 from feed cassette 42 to discharge tray 48 arranged in an upper portion of body 30 through image transfer section 46 located between drum 32 and transfer charger 40. Aligning roller pair 52 is arranged on the upstream side of image transfer section 46 of convey path 50, and fixing unit 54 (heat roller) and discharge roller pair 56 are arranged on its downstream side.

Electrostatic latent image forming section 36 comprises semiconductor laser oscillator 58 (laser diode or the like) for generating laser beam B modulated in accordance with dot image data from the host system (not shown), lens system 60 such as a collimator lens for focusing laser beam B emitted from laser oscillator 58, and polyhedral rotary mirror 62 (polygon mirror) for scanning laser beam B focused by lens system 60. In addition, electrostatic latent image forming section 36 comprises mirror motor 64 for rotating rotary mirror at a high speed, fθ lens 66 for allowing laser beam B scanned by rotary mirror 62 to pass therethrough, reflecting mirrors 68 and 70 for reflecting laser beam B passing through fθ lens 66 toward drum 32, correction lens 72 for allowing laser beam B reflected by reflecting mirrors 68 and 70 to pass therethrough and guiding it toward the surface of drum 32, and a beam detector or the like to be described later for detecting laser beam B scanned by rotary mirror 62.

Figure 3:
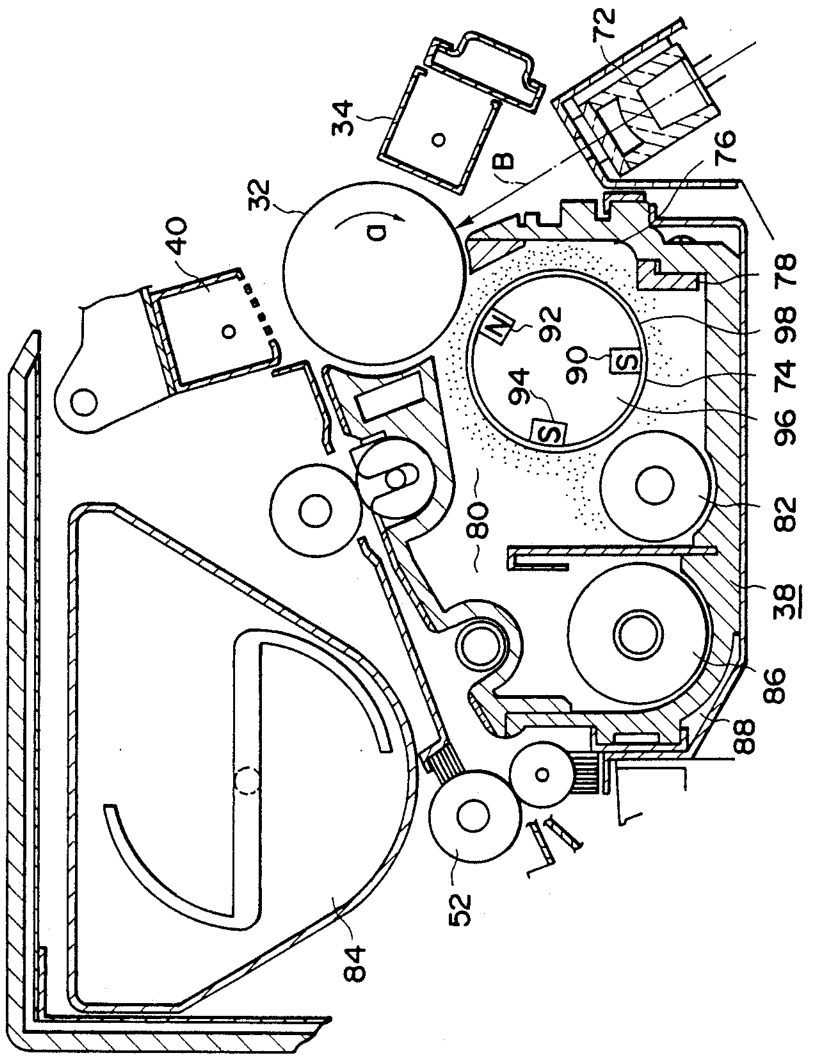
FIG. 3 is a sectional view showing in detail a developing unit and its peripheral parts.

FIG. 3 shows developing unit 38 and its peripheral parts in detail. Developing unit 38 develops an image using a magnetic brush method employing a two-component developer consisting of a toner and a carrier. More specifically, developing unit 38 comprises developing roller 74, doctor blade 78 for limiting the thickness of developer magnetic brush 76 formed on the surface of developing roller 74, developer agitator 82 arranged in developer storage 80, conveyor unit 86 for agitating and conveying toner replenished from toner replenishing section 84 (toner hopper), and casing 88 for housing these parts. Developing roller 74 comprises magnetic roll 96 incorporating three magnetic pole portions 90, 92, and 94, and sleeve 98 to be rotated counterclockwise around magnetic roll 96. Note that a predetermined bias voltage, e.g., about −400 V is applied to sleeve 98.

Developing unit 38 having such an arrangement is integrally formed with the photoconductive drum 32 into a unit so as to be detachably arranged in body 30.

The above-described developing unit is described in detail in, e.g., Japanese Patent Application No. 62-24605.

Figure 4:
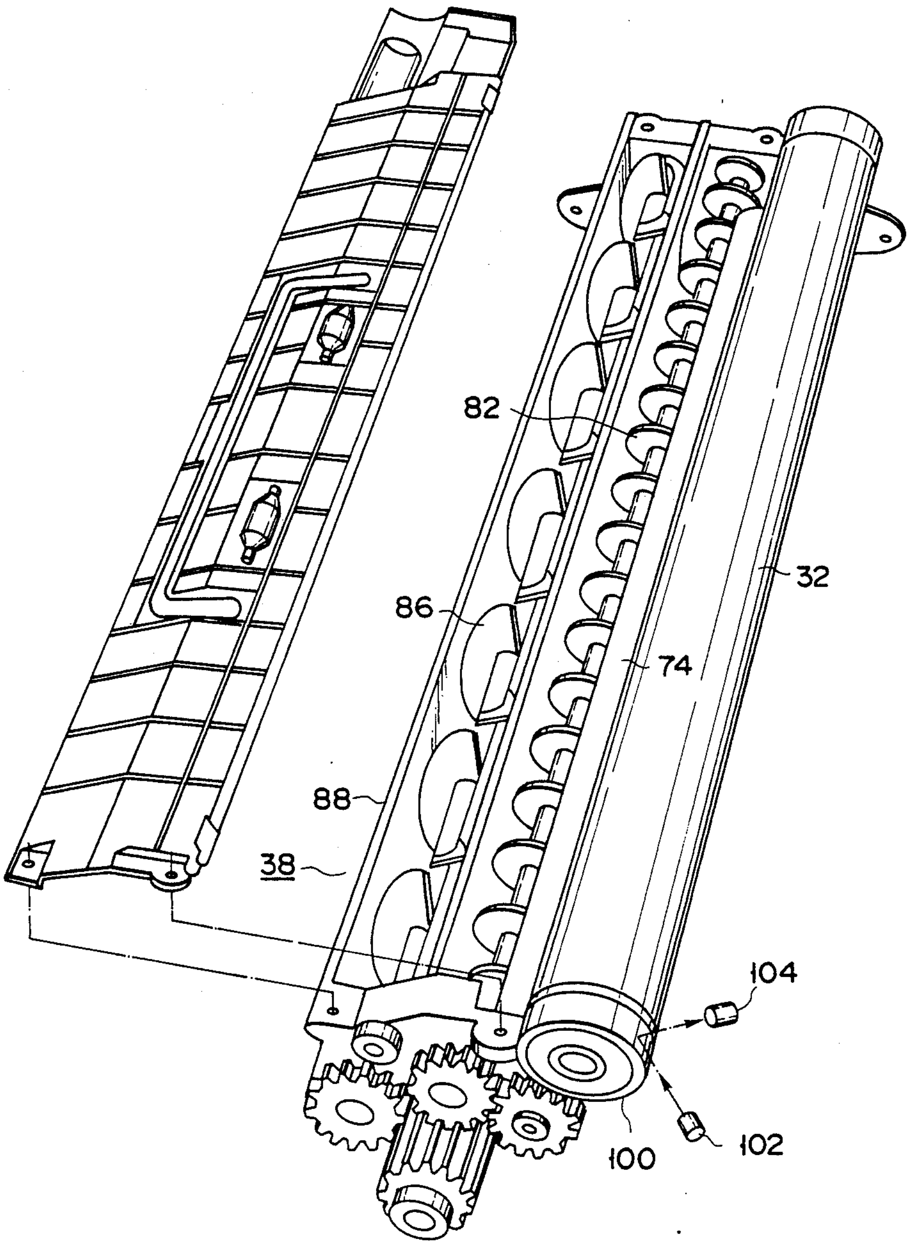
FIG. 4 is a perspective view showing a photoconductive drum and a toner density detecting probe arranged to oppose the drum.

As shown in FIG. 4, cylindrical toner density detecting probe 100 having the same outer diameter as that of photoconductive drum 32 is attached to one end portion of drum 32. Toner density detecting probe 100 is rotated with drum 32, and its outer surface is in contact with developer magnetic brush 76. With this arrangement, toner is adhered to the outer surface of toner density detecting probe 100 in proportion to the density of the toner in a developer. Light (infrared ray) from light-emitting diode (light-emitting element) 102 is radiated onto the outer surface of toner density detecting probe 100, and then the reflected light is received by photodiode (light-receiving element) 104. Therefore, even when the service life of the integral unit of developing unit 38 and drum 32 comes to an end, and is discarded, light-emitting and -receiving elements 102 and 104 as the toner density detecting section are left in the laser printer. With this operation, photodiode 104 receives a light amount in reverse proportion to the toner amount (toner density of the developer) adhered to the outer surface of toner density detecting probe 100. Therefore, if the toner density of the developer is decreased, the light amount received by photodiode 104 is increased.

Figure 5:
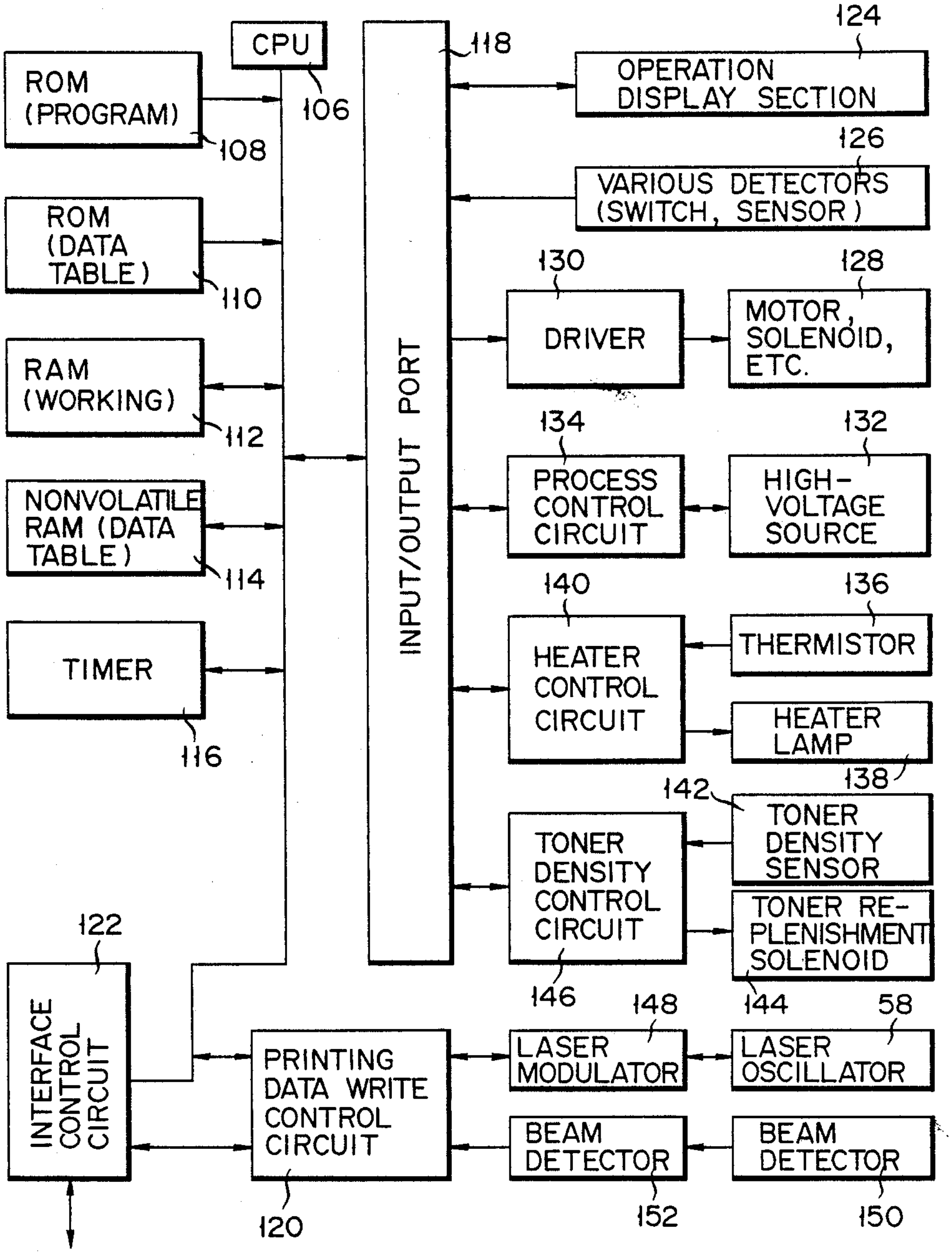
FIG. 5 is a block diagram showing an arrangement of a control section.

An arrangement of a control section of the laser printer having the above-described arrangement will be described with reference to FIG. 5. The control section comprises CPU (central processing unit) 106 serving as a control center, ROM (read-only memory) 108 for storing a system program, ROM 110 for storing a first data table, RAM 112 to be used as a working memory, erasable nonvolatile RAM 114 for storing a second data table, timer 116, input/output port 118, printing data write control circuit 120, and interface control circuit 122 for controlling the interface with the host system. Timer 116 is a general-purpose timer for generating a fundamental timing signal for controlling a paper convey and photosensitive body rotation process and the like.

Input/output port 118 outputs display data to operation display section 124, receives various switch data and data from various detectors (a microswitch, a sensor, and the like), outputs data to driver 130 for driving drive system 128 (various motors, clutches, solenoids, and the like), inputs/outputs data from/to process control circuit 134 for controlling an output from high-voltage source 132 and the like, inputs/outputs data from/to heater control circuit 140 for controlling the temperature of heater lamp 138 of fixing unit 54 in response to an output signal from temperature detecting element (thermistor or the like) 136 attached to fixing unit 54, and receives an output signal from toner density sensor 142 for measuring a toner density in develop-ing unit 38 and inputs/ outputs data to/from toner density control circuit 146 for controlling toner replenishment solenoid 144 which, in turn, replenishes toner to developing unit 38.

Printing data write control circuit 120 drives/ controls laser modulator 148 for performing light modulation control of laser oscillator 58, thereby writing printing data of a video image transferred from the host system at a predetermined position on drum 32. In this case, beam detector 150 detects laser beam B scanned by rotary mirror 62. Beam detector 152 generates a horizontal sync signal by shaping an output signal from detector 150, and outputs it to printing data write control circuit 120.

Interface control circuit 122 outputs status data to the host system, and receives command data and printing data from the host system.

Figure 6:
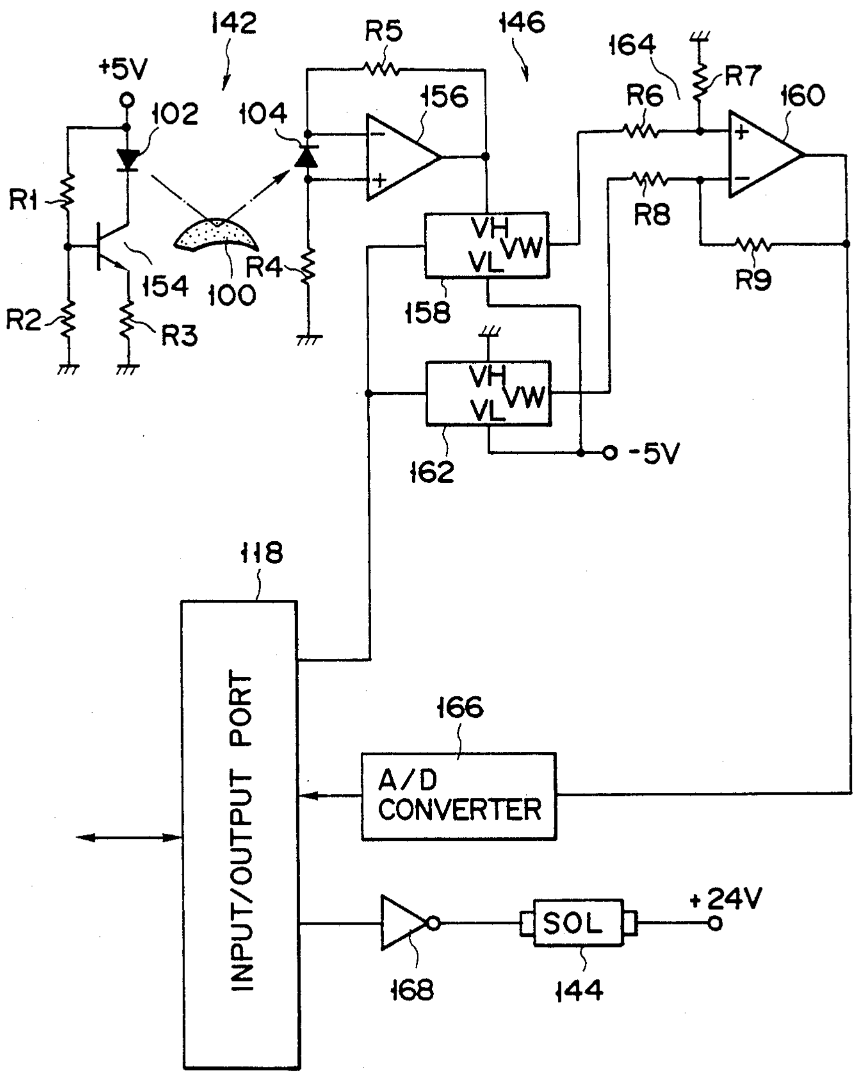
FIG. 6 is a block diagram showing a detailed arrangement of a toner density control circuit, a toner density sensor, and a toner density replenishment solenoid.

FIG. 6 shows toner density control circuit 146, toner density sensor 142, and toner replenishment solenoid 144 in detail. As shown in FIG. 6, one end of each of resistors R1 and R2, and one end of resistor R3 are respectively coupled to the base and emitter of transistor 154. Light-emitting diode 102 with the polarities shown in FIG. 6 and biased with +5 V is coupled to the collector of transistor 154. The other end of each of resistors R2 and R3 is grounded. The other end of R1 is coupled to the anode of light-emitting diode 102. They constitute a driver, specifically a constant-current driver, of light-emitting diode 102. Light from light-emitting diode 102 is reflected by the outer surface of toner density detecting probe 100, and is received by photodiode 104. A photocurrent converted by photodiode 104 is amplified and converted into a voltage by resistors R4 and R5 and amplifier 156. In this case, photodiode 104 with the polarities shown in FIG. 6 is coupled to the input terminals (positive and negative sides) of amplifier 156. The positive input terminal is grounded through resistor R4. The negative input terminal is coupled to the output terminal of photodiode 104 through resistor R5.

An output from amplifier 156 is supplied to one input terminal VH of nonvolatile potentiometer 158. The other input terminal VL of nonvolatile potentiometer 158 is biased with −5 V, and output VW is supplied to the positive input terminal of amplifier 160 through resistor R6. In addition, this positive input terminal is grounded through resistor R7. One output VW from nonvolatile potentiometer 162 is supplied to the negative input terminal of amplifier 160 through resistor R8. In addition, the negative input terminal of amplifier 160 is coupled to its output terminal through resistor R9. In this case, resistors R6, R7, R8, and R9, and amplifier 160 constitute differential amplifier 164.

One input terminal VH of nonvolatile potentiometer 162 is grounded, and the other input terminal VL is biased with, e.g., −5 V. Nonvolatile potentiometers 158 and 162 are potentiometers for digitally controlling resistance values. For example, digital control potentiometers X9MME available from Zaico Co. Ltd., U.S.A. are used as the potentiometers. They are controlled by control signals from input/output port 118. A wiper position of the potentiometer is stored in an internal nonvolatile memory.

With such a circuit arrangement, output voltages from amplifier 156 can be adjusted by controlling nonvolatile potentiometers 158 and 162 using control signals from input/output port 118. The adjusted values are stored in nonvolatile potentiometers 158 and 162.

Output voltages from differential amplifier 164 are A/D-converted by A/D converter 166, and then received and processed by input/output port 118. Reference numeral 168 denotes a driver for driving toner replenishment solenoid 144 to which +24 V is applied. Driver 168 is ON/OFF-controlled by control signals from input/output port 118.

Figure 7:
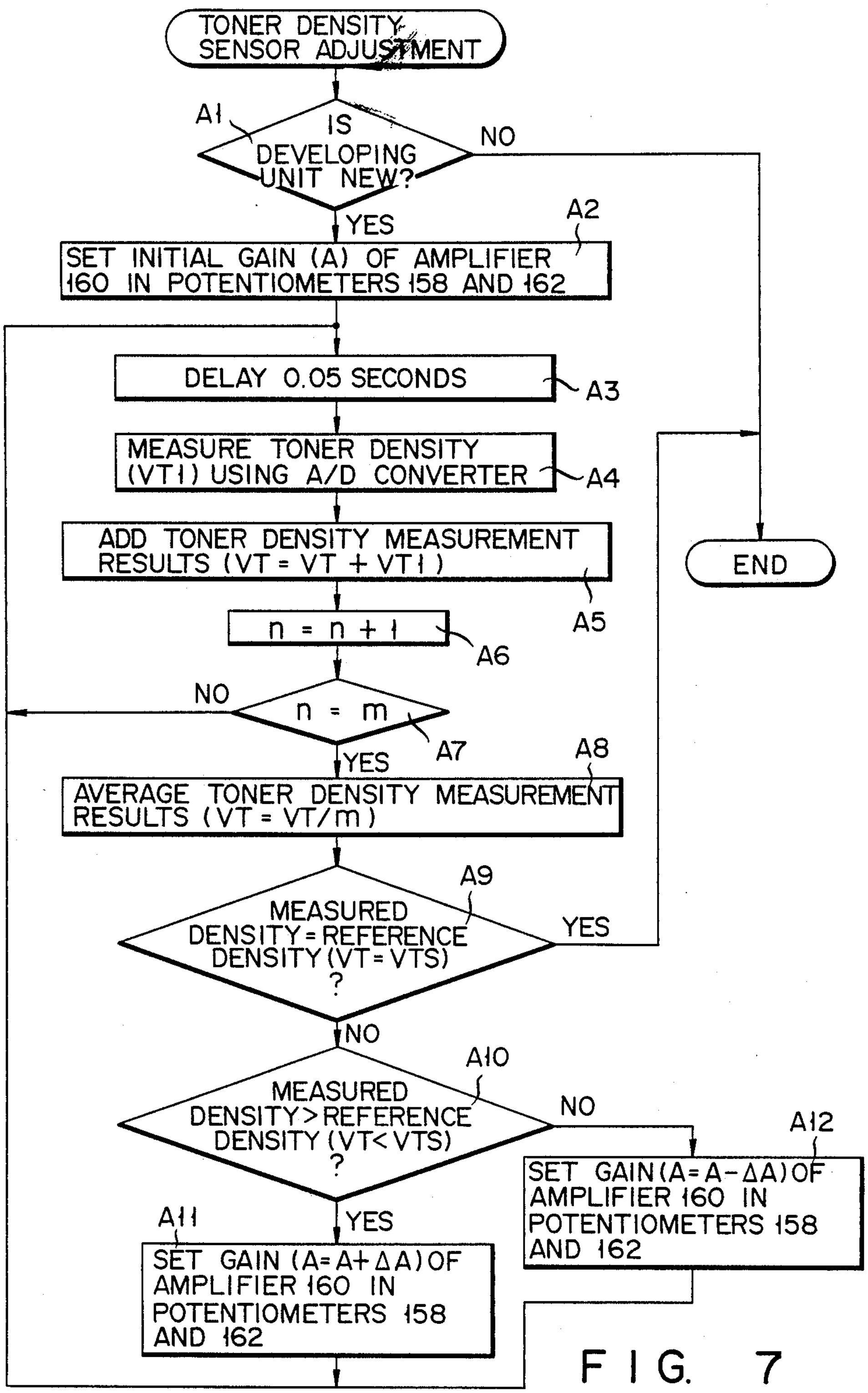
FIG. 7 is a flow chart showing an operation of a toner density sensor adjustment process.

An operation of toner density sensor adjustment in the above-described arrangement will be described with reference to the flow chart in FIG. 7.

In step A1, it is checked whether developing unit attached to laser printer body 30 is new or not. If NO in step A1, it is determined that the unit has been already adjusted, and the adjustment operation is ended. If new developing unit 38 is attached, CPU 106 starts adjustment of toner density sensor 142. More specifically, CPU 106 sets initial gain (A) of amplifier 160 in potentiometers 158 and 162 (step A2). Then, CPU 106 performs toner density measurement a plurality of times (m times) using A/D converter 166 (steps A3 to A7). More specifically, after the process is delayed by a predetermined period of time (in this case, 0.05 seconds) (step A3), a toner density (VTl) is measured by A/D converter 166 in step A4. In step A5, a resultant value obtained by measuring the toner density is added ($VT = VT + VTl$). In step A6, 1 is added to the number of measuring operations ($n = n + 1$). The operations in steps A3 to A7 are repeated until n=m is established in step A7. If n=m, i.e., the number of toner density measuring operations becomes m, the flow advances to step A8.

In step A8, the toner density measurement results obtained in steps A3 to A7 are averaged (VT=VT/m). Then, the averaged measured density (VT) is compared with a first reference density (reference toner density; VTS) prestored in ROM 110 (step A9). Upon comparison of these values, if the measured density coincides with the reference toner density (VT=VTS), adjustment of toner density sensor 142 is ended. If they do not coincide with each other, the flow advances to step A10, and it is checked whether the measured density (VT) is lower than the first reference density (VTS). If the measured density is higher than the first reference density (VT< VTS) in step A10, a gain ($A = A + \Delta A$) of amplifier 160 is set in potentiometers 158 and 162 (step A11). If the measured density is lower than the first reference density (VT>VTS) in step A10, a gain ($A = A - \Delta A$) of amplifier 160 is set in potentiometers 158 and 162 (step A12).

When the flow advances to A11 or A12 in this manner, it returns to step A3, and the above-described operations are repeated. When the measured density and the first reference density coincide with each other in step A9, adjustment of toner density sensor 142 is ended.

Figure 8:
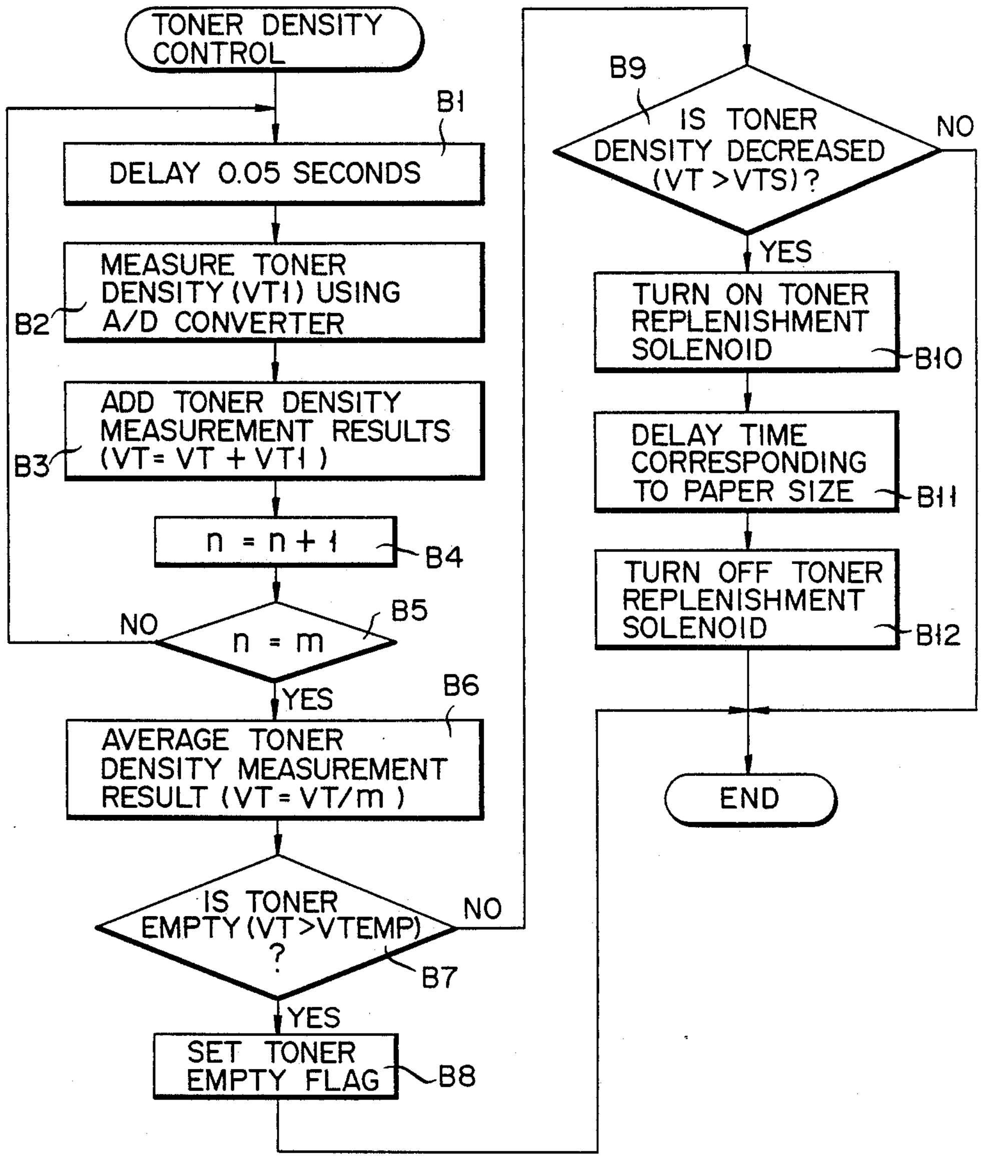
FIG. 8 is a flow chart showing an operation of a toner density control process.
Figure 9A:
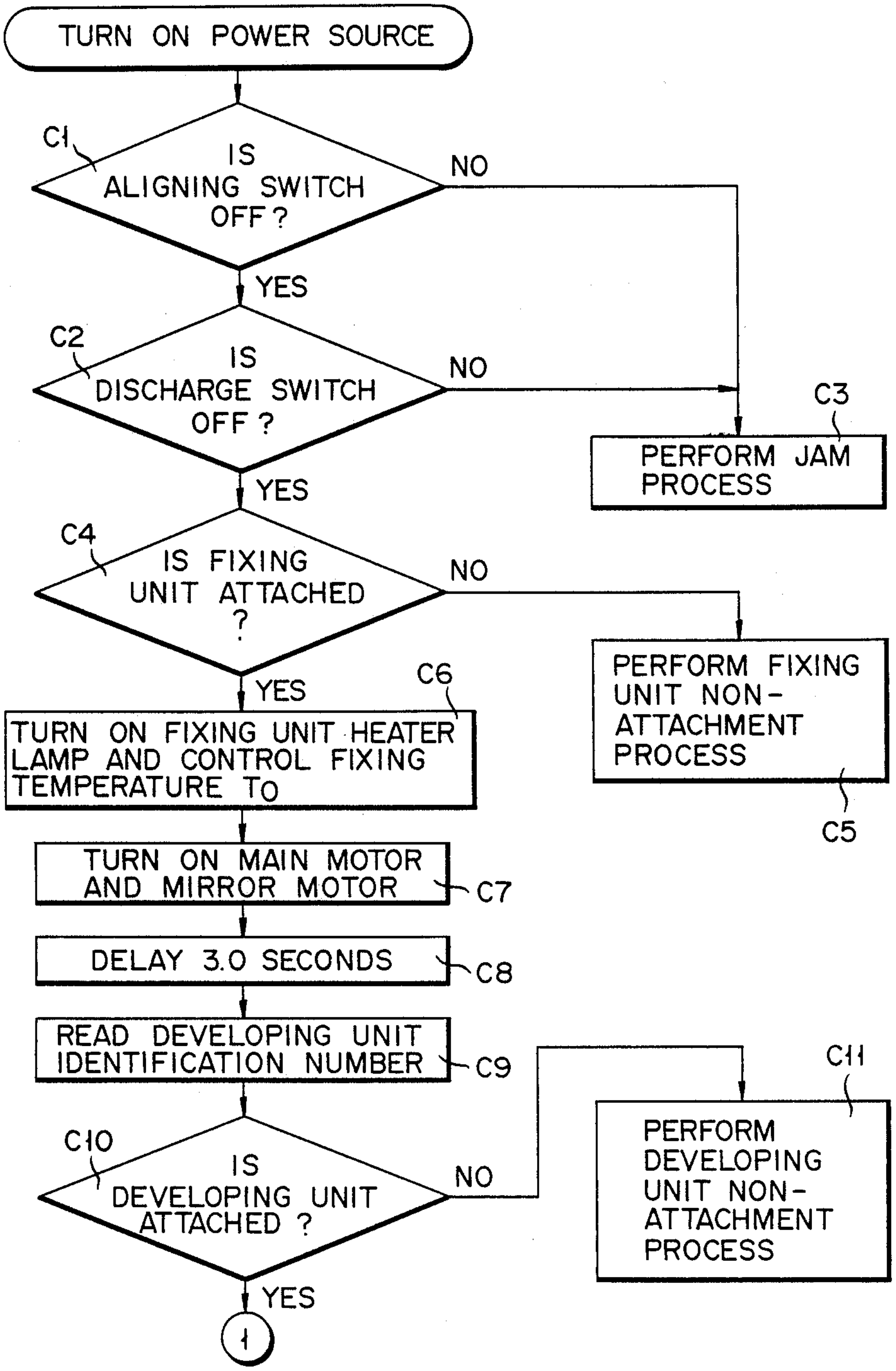
Figure 9B:
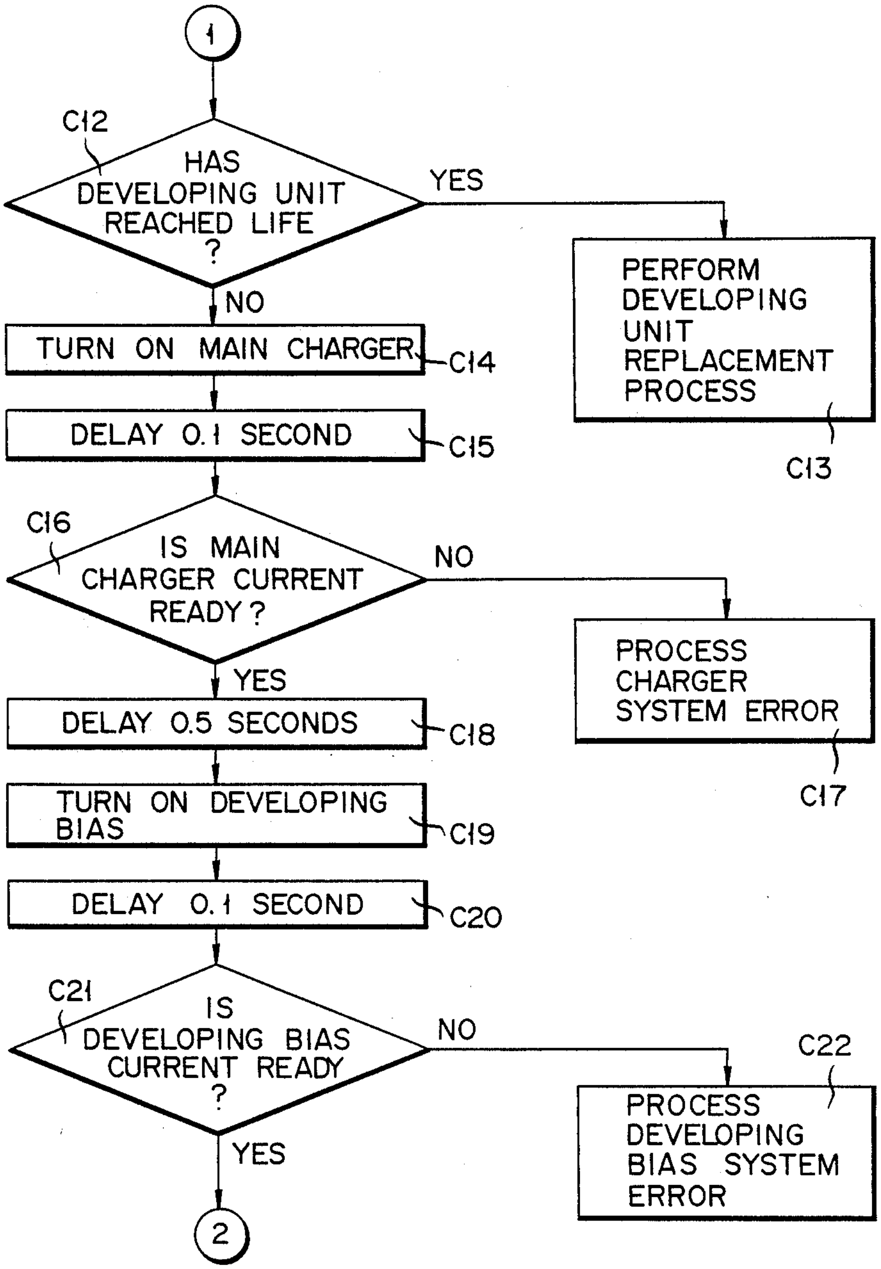
Figure 9C:
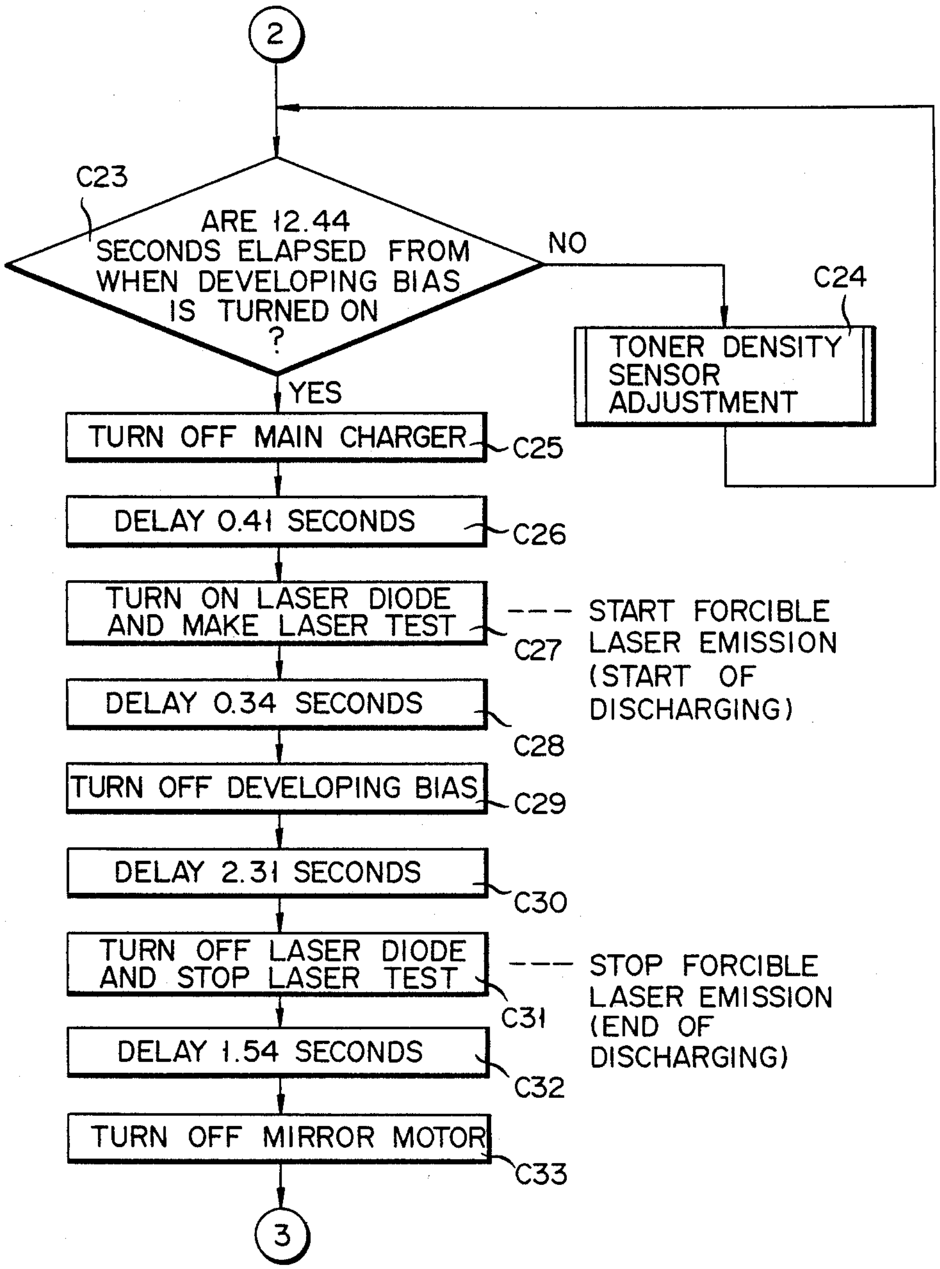
Figure 9D:
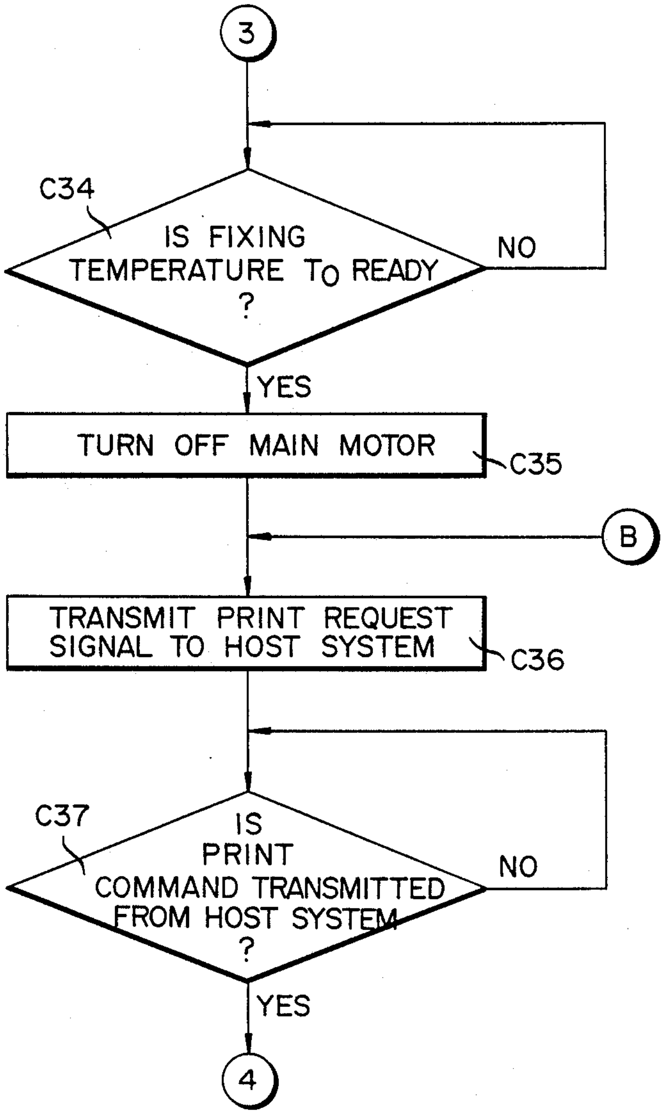
Figure 9E:
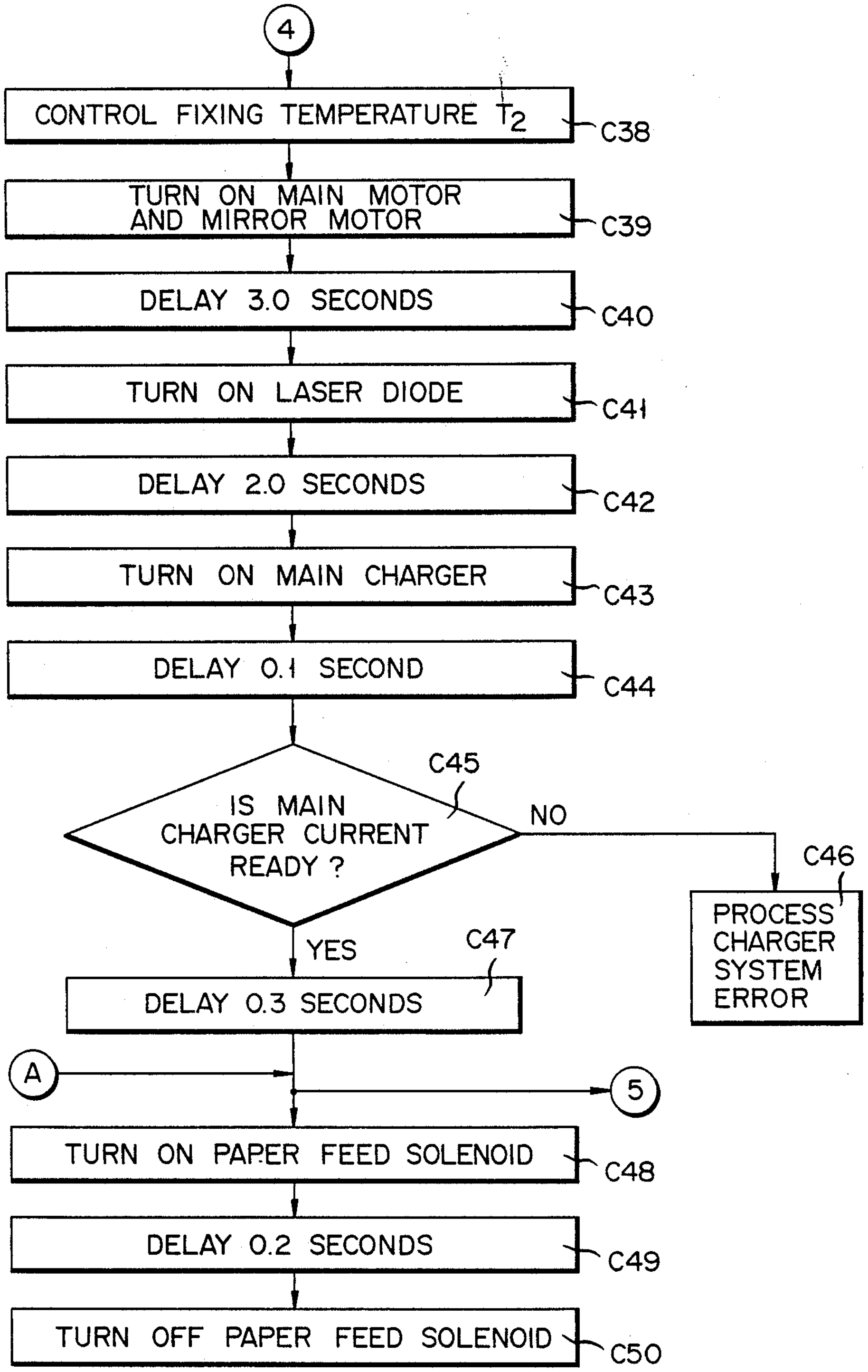
Figure 9F:
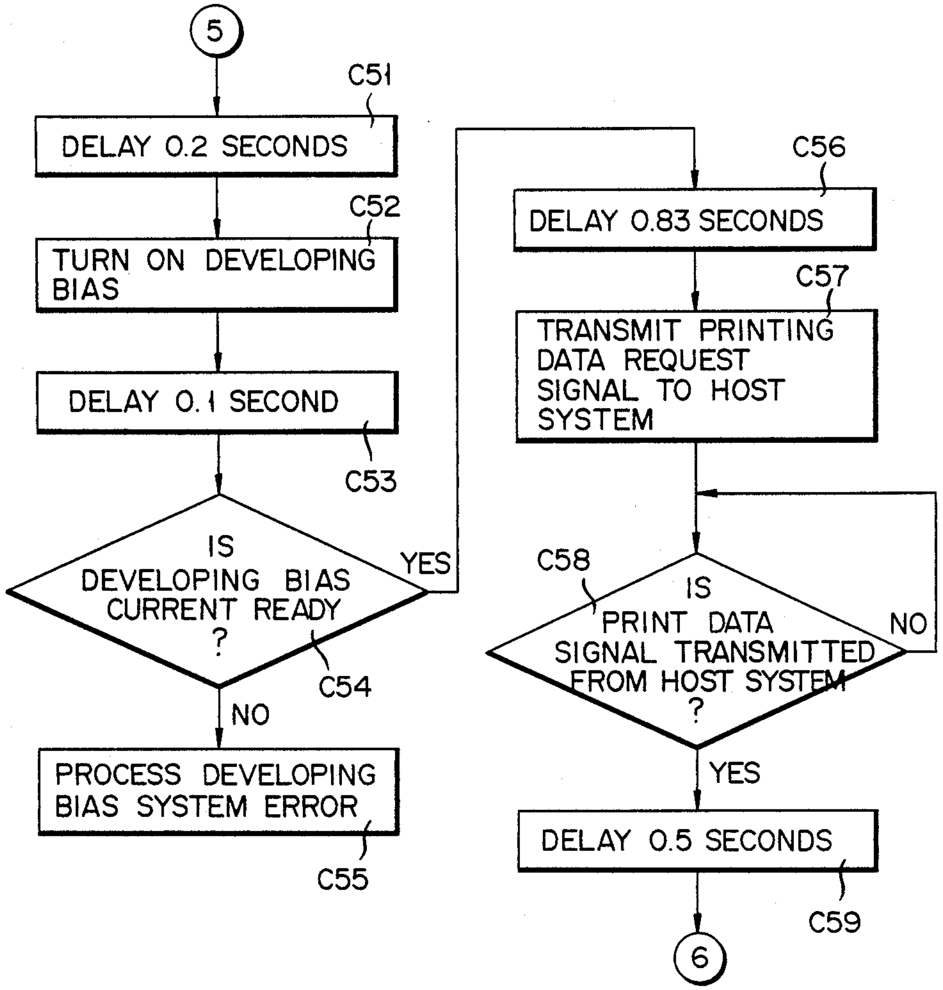
Figure 9G:
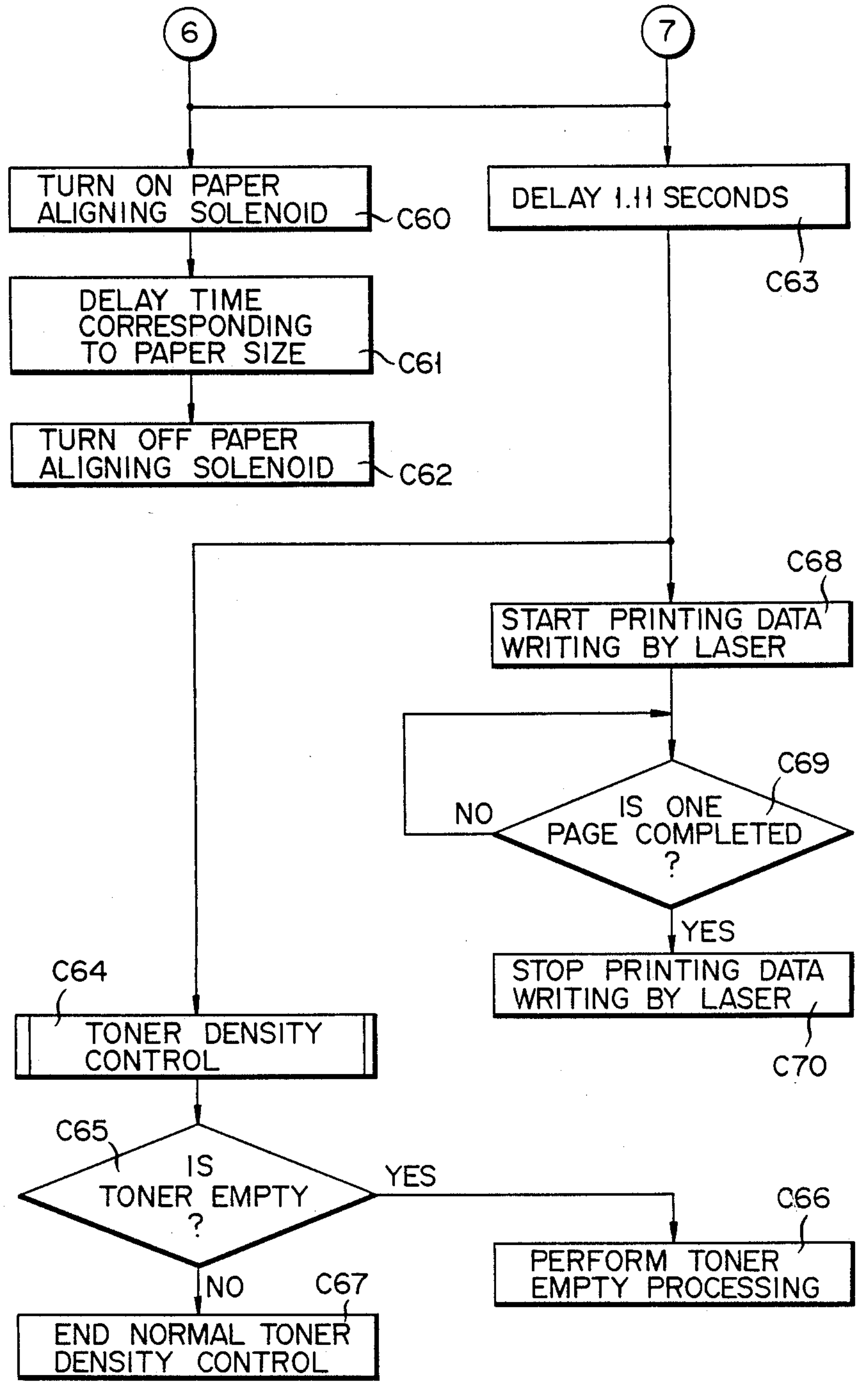
Figure 9H:
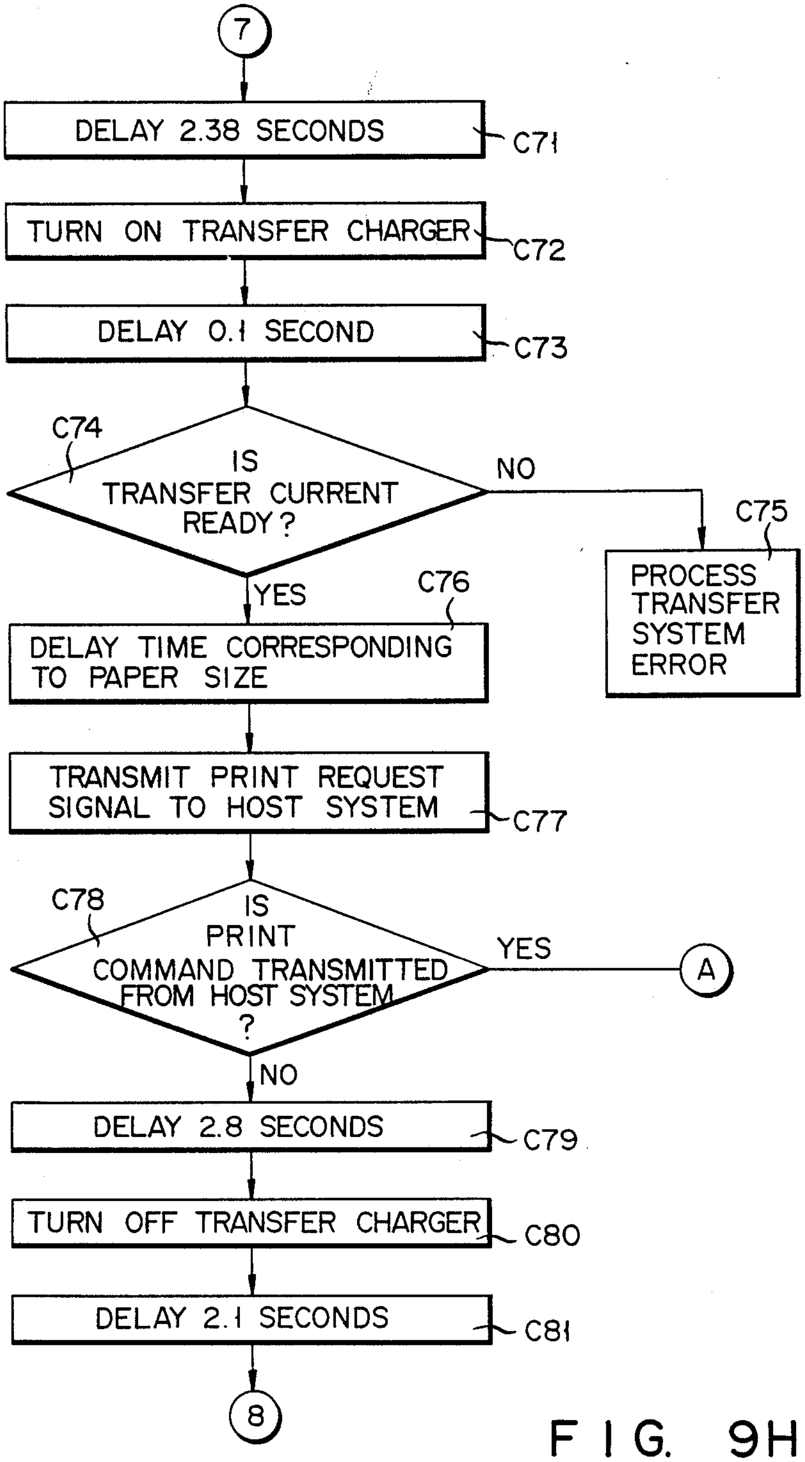
Figure 91:
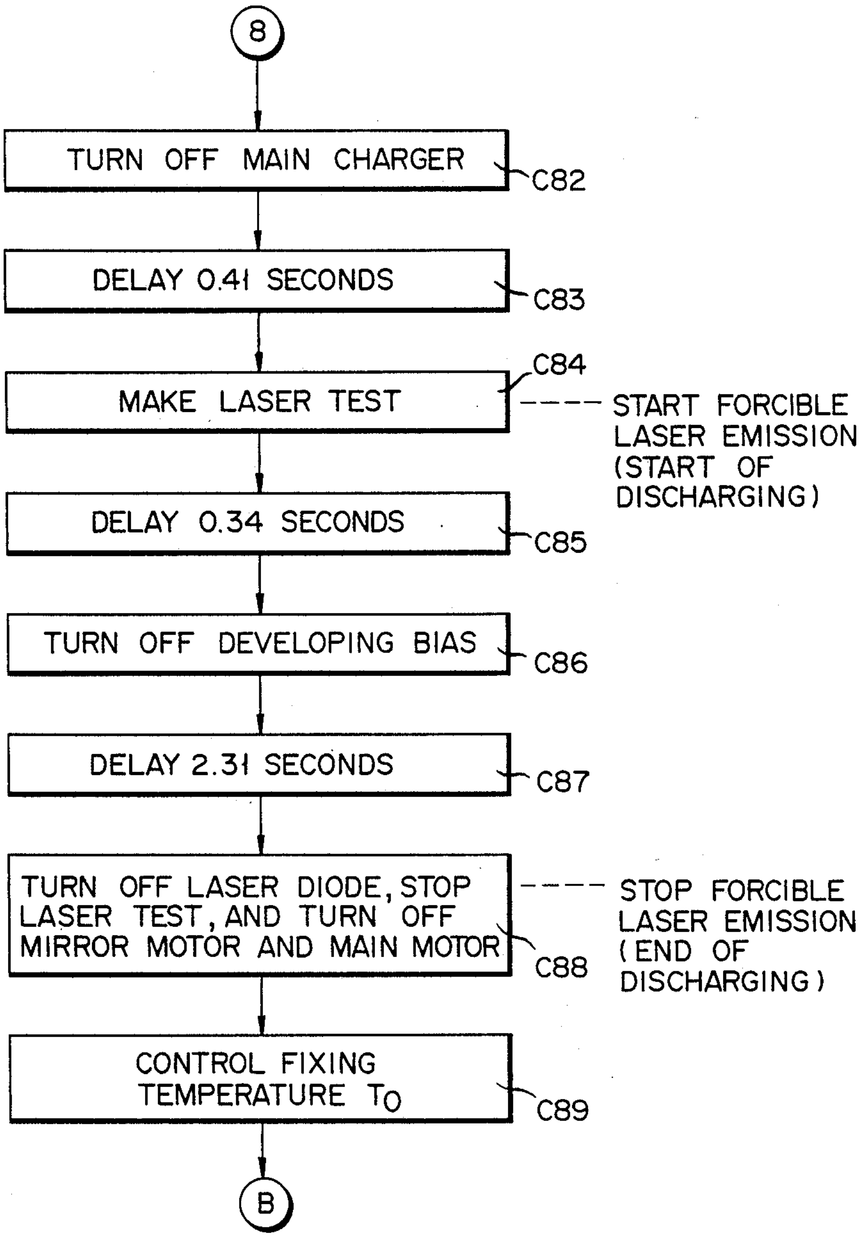

When adjustment of toner density sensor 142 is ended in this manner, normal toner density control is performed. An operation of toner density control will be described with reference to the flow chart in FIG. 8.

When a toner density control operation is started, CP 106 performs toner density measurement a plurality of times (m times) using A/D converter 166 (step B1). More specifically, after the process is delayed by a predetermined period of time (in this case, 0.05 seconds) in step B1, a toner density (VTl) is measured using A/D converter 166 in step B2. In step B3, a resultant value obtained by measuring the toner density is added ($VT = VT + VTl$). In step B4, 1 is added to the number o measuring operations ($n = n + 1$). The operations in steps B1 to B5 are repeated until n=m is established in step B5. When n=m, i.e., the number toner density measuring operations becomes m, the flow advances to step B6.

In step B6, the toner density measurement results obtained in steps B1 to B5 are averaged (VT=VT/m). Then, the averaged measured density (VT) is compared with a second reference density (VTEMP) prestored in ROM 110 (step B7). The second reference density is a toner density in a toner empty state, and is set to be lower than the first reference density. Upon comparison in step B7, if the measured density is lower than the second density (VT>VTEMP), CPU 106 sets a toner empty flag (step B8), and finishes toner density control. In this case, if the toner empty flag is set, CPU 106 performs a toner empty process. More specifically, CPU 106 causes operation display section 124 to display "toner empty" so as to inform an operator that the amount of replenishment toner in toner replenishing section (toner hopper) 84 becomes smaller than a predetermined amount and to stop the printing operation.

When the measured density (VT) and the second reference density (VTEMP) are compared with each other in step B7 and it is determined that the measured density is higher than the second reference density in step B7 (VT<VTEMP), the flow advances to step B9, and the measured density (VT) averaged by CPU 106 is compared with the first reference density (VTS). If the measured density is higher than the first reference density (VT<VTS) in step B9, toner density control is ended. If the measured density is lower than the first reference density (VT>VTS) in step B9, the flow advances to step B10. In step B10, toner replenishment solenoid 144 is turned on. After the process is delayed by a period of time corresponding to a paper size (step B11), toner replenishment solenoid 144 is turned off (step B12). By setting toner replenishment solenoid 144 in an ON state for a predetermined period of time, toner is replenished to developing unit 38, and then toner density control is completed.

In the above-described toner density control apparatus, measurement results of the toner density sensor and the predetermined reference values are compared with each other, and a toner empty operation is controlled on the basis of the comparison result. With this operation, a toner empty state can be accurately detected compared with a conventional mechanical detecting method. In addition, mechanical units attached to the inside and outside of a conventional toner hopper can be omitted, thereby simplifying the structure of the toner hopper and preventing a user or a maintenance personnel from touching the toner hopper. Moreover, even if the toner hopper is formed into a cartridge, a toner empty state can be detected at a portion other than a cartridge mechanism, and hence a cartridge section can be simplified and the cost can be reduced.

An overall operation of the laser printer arranged in the above-described manner will be described with reference to the flow charts in FIGS. 9A through 9I.

When the laser printer is turned on, it is checked whether an aligning switch is OFF or not (step C1). If it is OFF, then, it is checked whether a discharge switch is OFF or not (step C2). If the switches are in an ON state in steps C1 and C2, it means that paper P is present in convey path 50. Then, the flow advances to step C3 and jam process is performed. If the switch is OFF in step C2, then, t is checked whether fixing unit 54 is attached or not (step C4). If it is not attached, an attachment process of unit 54 is performed (step C5). If unit 54 is attached, heater lamp 138 in unit 54 is turned on, and fixing temperature $T_O$ is controlled (step C6).

Subsequently, a main motor and mirror motor 64 are turned on (step C7), and the process is delayed by 3.0 seconds (step C8). Then, the identification number of developing unit 38 is read (step C9). It is checked whether developing unit 38 is attached or not (step C10). If it is not attached, an attachment process is performed (step C11). If it is attached, the service life of unit 38 is checked (step C12). If the service life of unit 38 has come to an end, a replacement process of unit 38 is performed (step C13). If it need not be replaced, main charger 34 is turned on (step C14), and the process is delayed by 0.1 second (step C15).

In step C16, a current of charger 34 is checked. If an error is found, the flow advances to step C17, and a charger system error is processed. If no error is found, the process is delayed by 0.5 seconds (step C18), and then a developing bias is turned on (step C19). In addition, the process is delayed by 0.1 second (step C20). Thereafter, a developing bias current is checked (step C21). If an error is found, a developing bias system error is processed (step C22). If no error is found, the flow advances to step C23.

In step C23, an elapsed time from when the developing bias is turned on is checked. If 12.44 seconds have not elapsed, the flow advances to step C24, and toner density sensor adjustment is performed. The operation of this toner density sensor adjustment is the same as that described above with reference to the flow chart (steps Al to A12) in FIG. 7, and hence a description thereof will be omitted. When this adjustment is finished, the flow returns to step C23, and an elapsed time is checked again. If 12.44 seconds have elapsed in step C23, main charger 34 is turned off (step C25). Then, the process is delayed by 0.41 seconds (step C26), and forcible laser emission is started (start of discharging) (step C27). More specifically, laser diode 58 is turned on and a laser test is made. Then, the process is delayed 0.34 seconds (step C28), and the developing bias is turned off (step C29). After the process is delayed by 2.31 seconds (step C30), laser diode 58 is turned off and the laser test is stopped. That is, forcible laser emission is stopped (end of discharging) (step C31).

Upon completion of discharging, the process is delayed by 1.54 seconds (step C32), and then mirror motor 64 is turned off (step C33). Fixing temperature $T_O$ controlled in step C6 is checked (step C34). Checking is repeated until the fixing temperature reaches $T_O$. When YES is obtained in step C34, the main motor is turned off (step C35).

A print request signal is supplied to the host system (step C36). Then, checking is repeated until a print command is supplied from the host system (step C37). When the print command is supplied from the host system, fixing temperature $T_2$ is controlled in step C38, and the main motor and mirror motor 64 are turned on in step C39. After the process is delayed by 3.0 seconds in step C40, laser diode 58 is turned on in step C41. The process is delayed by 2.0 seconds, charger 34 is turned on (step C43), and then the process is delayed by 0.1 second (step C44).

In step C45, a charger current is checked. If an error is found, the flow advances to step C46, and charger system error is processed. If no error is found, the flow advances to step C47, and the process is delayed by 0.3 seconds. A paper feed solenoid is turned on in step C48, and the processed is delayed by 0.2 seconds (step C49). Then, the paper feed solenoid is turned off (step C50). After step C47, the flow advances to step C51 and the process is delayed by 0.2 seconds. After the developing bias is turned on (step C52) and the process is delayed by 0.1 second (step C53), a developing bias current is checked in step C54. If an error is found, a developing bias system error is processed (step C55). If no error is found, after the processed is delayed by 0.83 seconds (step C56), a print data request signal is supplied to the host system (step C57). Then, it is checked whether signal is supplied from the host system (step C58). The operation in step C58 is repeated until the signal is obtained.

When the print data transmission signal is obtained in this manner, the process is delayed by 0.5 seconds (step C59), and then the paper aligning solenoid is turned on (step C60). The process is delayed by a period of time corresponding to a paper size (step C61), and the paper aligning solenoid is turned off (step C62).

The process is delayed by 1.11 seconds in step C63 simultaneously with the operation in step C60. Thereafter, toner density control is performed in step C64. The operation of this toner density control is described in detail with reference to the flow chart in FIG. 8, and hence a description thereof will be omitted. After the toner density control is completed, it is checked whether the toner is empty (step C65). If it is empty, a toner empty process is performed (step C66). If it is not, the flow advances to step C67, and the toner density control is ended.

After the process is delayed in step C63, writing of printing data is started using a laser in step C68. Then, it is checked in step C69 whether one page is completed. After checking is repeated in step C69 until one page is completed, printing data writing by means of the laser is stopped (step C70).

After the operation in step C59, the flow advances to step C71 as well as to steps C60 and C63 so as to delay the process by 2.38 seconds. Then, charger 40 is turned on (step C72). After the process is delayed by 0.1 second (step C73), a current of transfer charger 40 is checked (step C74). If an error is found in step C74, a transfer system error is processed (step C75). If no error is found, the process is delayed by a period of time corresponding to a paper size (step C76). Subsequently, a print request signal is supplied to the host system (step C77). The presence/absence of a print command from the host system is checked (step C78). If YES in step C78, the flow returns to steps C48 and C51.

If NO in step C78, the process is delayed by 2.8 seconds in step C79 and transfer charger 40 is turned off (step C80). The process is delayed by 1.2 seconds (step C81),and main charger 34 is turned off (step C82). Then, the process is delayed by 0.41 seconds (step C83), and forcible laser emission is started (start of discharging). That is, a laser test is made (step C84). In step C85, the process is delayed by 0.34 seconds. In step C86, the developing bias is turned off. In addition, in step C87, the process is delayed by 2.31 seconds. Subsequently, in step C88, forcible laser emission is stopped (end of discharging). That is, laser diode 58 is turned off, and at the same time, the laser test is stopped, and mirror motor 64 and the main motor are turned off. If discharging is completed in this manner, fixing temperature $T_O$ is controlled in step C89. Then, the flow advances to step C36.

More specifically, when a print start signal is supplied from the host system, photoconductive drum 32 is rotated and is uniformly charged by main charger 34 such that its surface potential is set to be, e.g., −600 V. When dot image data is supplied from the host system, laser beam B modulated in accordance with the dot image data is emitted to electrostatic latent image forming section 36. Then, the surface of charged drum 32 is scanned/exposed with laser beam B to form an electrostatic latent image on the surface of drum 32. The electrostatic latent image formed on drum 32 is reversely developed by developing unit 38 and is formed into a toner image. In this case, developing unit 38 removes (cleans) residual toner on drum 32 upon transfer simultaneously with the reversely developing operation. The toner image on drum 32 is transferred onto paper P conveyed by feed cassette 42 in image transfer section 46 by the effect of transfer charger 40. Paper P having the toner image transferred thereon is conveyed to fixing unit 54, and the toner image is fixed. Thereafter, paper P is discharged onto discharge tray 48 by discharge roller pair 56.

Upon completion of the image forming operation, discharging of drum 32 is performed by electrostatic latent image forming section 36. More specifically, transfer charger 40 is turned off. At this time, positive charges due to transfer charger 40 are still left on drum 32 between transfer charger 40 and main charger 34. For this reason, after the surface of drum 32 is uniformly charged with negative charges by main charger 34, main charger 34 is turned off. Then, laser oscillator 58 is operated to emit light (light modulation is not performed). At the same time, rotary mirror 62 is rotated, and the entire surface of drum 32 is exposed with laser beam B scanned by rotary mirror 62, thereby discharging drum 32. Subsequently, the rotation of drum 32 is stopped and this processed is completed. These control operations are performed by the control section using CPU 106 shown in FIG. 5 as a main controller.

Although, in the above-described embodiment, a toner density is measured using the reflection type sensor, a transmission type sensor may be used. In this case, the toner density detecting probe may be made of a transparent member.

What is claimed is:

1. An image forming apparatus comprising:
an image carrier;
developer supplying means for supplying developer to the image carrier;
developer density detecting means arranged on a portion of said image carrier whereon the latent image is not formed, for detecting the density of said developer; and
comparing means for comparing a developer density value detected by said developer density detecting means with reference values indicating a need either to replenish the developer supply or to stop operation of the image forming apparatus.

2. An apparatus according to claim 1, wherein said developer supplying means comprises a developing unit , said developing unit storing the developer used to developing the electrostatic latent image, and developer replenishing means for storing a replenishment developer therein and for replenishing the developer supplied to said developing unit using said stopping means in accordance with the comparison result from said comparing means.

3. An apparatus according to claim 1, wherein said comparing means comprises first comparing means for comparing the developer density value detected by said developer density detecting means with a first reference value, and second comparing means for comparing the developer density value detected by said developer density detecting means with a second reference value lower than that of said first reference value.

4. An apparatus according to claim 3, wherein the first reference value represents a reference density of the developer, and the second reference value represents that the state developer replenishing means is empty.

5. An apparatus according to claim 4, further comprising alarm means for representing the state of the replenishment developer stored in said developer replenishing means in accordance with a comparison result from said second comparing means.

6. An apparatus according to claim 5, wherein said developer density detecting means includes a lightemitting element for radiating light onto said image carrier, and a light-receiving element for receiving the light radiated from said light-emitting element onto said image carrier and reflected therefrom.

7. An apparatus according to claim 6, wherein said developer density detecting means, including said lightemitting and light-receiving elements, are arranged outside of said developing unit.

8. An apparatus according to claim 7, wherein said alarm means includes a display section for displaying the state of the replenishment developer.

9. An image forming apparatus comprising:

electrostatic latent image forming means for forming an electrostatic latent image on a predetermined area of an image carrier;

developer supplying means for supplying a developer for developing the electrostatic latent image formed on said image carrier by said electrostatic latent image forming means;

image transfer means for transferring the image developed by said image developer supplying means onto a recording medium;

the density detecting means arranged on a portion of said image carrier whereon the electrostatic latent image is not formed, for detecting a developer density of the developer;

comparing means for comparing a developer density value detected by said developer density detecting means with a reference value; and stopping means for stopping operations of said electrostatic latent image forming means or said developer supplying means in accordance with a comparison result from said comparing means.

10. An apparatus according to claim 9, wherein said supplying means comprises a developing unit which opposes said image carrier, said developing unit storing the developer for developing the electrostatic latent image, and developer replenishing means for storing a replenishment developer therein for replenishing the developer supplied to said developing unit in accordance with the comparison result from said comparing means.

11. An apparatus according to claim 10, wherein said comparing means comprises first comparing means for comparing the developer density value detected by said developer density detecting means with a first reference value, and second comparing means for comparing the developer density value detected by said developer density detecting means with a second reference value.

12. An apparatus according to claim 11, wherein the first reference value represents a reference density of the developer, and the second reference value represents that the developer replenishing means is empty.

13. An apparatus according to claim 12, further comprising alarm means for indicating the state of said replenishment developer stored in said developer replenishing means in accordance with a comparison result from said second comparing means.

14. An apparatus according to claim 13, wherein said developer density detecting means comprises a light-emitting element for radiating light onto said image carrier, and a light-receiving element for receiving the light radiated from said light-emitting element onto said image carrier and reflected therefrom.

15. An apparatus according to claim 14, wherein said developer density detecting means, including said light-emitting and light-receiving elements, are arranged outside of said developing unit.

16. An apparatus according to claim 15, wherein said alarm means includes a display section for displaying the state of the replenishment developer.

17. An apparatus according to claim 9, wherein said electrostatic latent image forming means includes a semiconductor laser oscillator for generating a laser beam, a lens system for focusing the laser beams emitted from said semiconductor laser oscillator, a polyhedral rotary mirror for scanning the laser beam focused by said lens system, a reflecting mirror for guiding the laser beam scanned by said rotary mirror onto said image carrier, and a correction lens.

18. An image forming apparatus for forming an electrostatic latent image in a predetermined area on an image carrier, comprising:

developer supplying means, including a developing unit for storing developer to be used in developing the electrostatic latent image formed on said image carrier by said electrostatic latent image forming means, and developer replenishing means for storing replenishment developer therein and replenishing the developer;

image transfer means for transferring the image developed by said developer supplying means onto a recording medium;

developer density optical detecting means comprising a light-emitting element for radiating light onto said image carrier, said light emitting element being arranged to radiate on a portion of said image carrier on which the electrostatic latent image is not formed and located outside of said developing unit, and a light-receiving element for receiving the light radiated from said light-emitting element and reflected by said image carrier, said developer density optical detecting means optically detecting the density of the developer;

first comparing means for comparing the developer density value optically detected by said developer density optical detecting means with a first reference value, said first reference value setting a reference density of the developer;

second comparing means for comparing the developer density value optically detected by said developer density optical detecting means with a second reference value, said second reference value representing that said developer replenishing means is empty; and stopping means for stopping operations of said latent image forming means, said image transfer means, or said developer replenishing means, in accordance with a comparison result from said second comparing means.

19. An apparatus according to claim 15, further comprising alarm means for representing the state of the replenishment developer stored in said developer replenishing means in accordance with the comparison result from said second comparing means.

20. An apparatus according to claim 18, wherein said electrostatic latent image forming means comprises a semiconductor laser oscillator for generating a laser beam, a lens system for focusing the laser beam emitted from said semiconductor laser oscillator, a polyhedral rotary mirror for scanning the laser beam focused by said lens system, a reflecting mirror for guiding the laser beam scanned by said rotary mirror onto said image carrier, and a correction mirror.

21. An image forming apparatus comprising:

an image carrier having an image forming area and a reference image forming area;

latent image forming means for forming an electrostatic latent image in the image forming area and an electrostatic latent reference image in the reference image forming area;

developer supplying means for supplying developer to both the electrostatic latent image and the electrostatic latent reference image on said image carrier;

developer density detecting means for photoelectrically detecting the density of the developer developing the electrostatic latent reference image formed on said image carrier to obtain a density signal having a value corresponding to the density of the developer;

comparing means for comparing the value of the density signal with a reference value; and stopping means for stopping operations of said developer supplying means when it is determined that the value of the density signal is less than the reference value.

22. An image forming apparatus comprising:

an image carrier having an image forming area and a reference image forming area;

latent image forming means for forming an electrostatic latent image at the image forming area and an electrostatic latent reference image at the reference image forming area;

developer supplying means for supplying developer to both the electrostatic latent image and the electrostatic latent reference image on said image carrier;

developer density detecting means for photoelectrically detecting the density of the developer supplied to the electrostatic latent reference image, to obtain a density signal having a value corresponding to the density of the developer;

first comparing means for comparing the value of the density signal with a first reference value, second comparing means for comparing the value of the density signal with a second reference value, which is smaller than the first reference value; and control means for respectively driving said developer supplying means to replenish the developer or stopping operation of the developer, depending on the value of the density signal.

23. An apparatus according to claim 22, which further comprises alarm means for outputting an alarm signal when the operation of said developer supplying means is stopped.

24. An image forming apparatus comprising:

means for supplying developer to an image carrier;

means for detecting the density of the developer;

first comparing means for comparing the developer density value detected by said detecting means with a first reference value;

second comparing means for comparing the developer density value detected by the detecting means with a second reference value which is less than the first reference value;

means for replenishing the developer in the supplying means when the comparison from the first and second comparing means indicates that the detected toner density is smaller than the first reference value and larger than the second reference value; and means for stopping the operation of the supplying means when the comparison from the second comparing means indicates that the detected toner density is smaller than the second reference value.

25. The image forming apparatus of claim 24, wherein said density detecting means is a cylindrical surface.

26. The image forming apparatus of claim 25, wherein said cylindrical surface is cylindrically formed on said image carrier.

27. The image forming apparatus of claim 24, wherein the density detecting means includes a photoresponsive element.

* * * * *